(12) United States Patent
Nagao et al.

(10) Patent No.: US 7,891,745 B2
(45) Date of Patent: Feb. 22, 2011

(54) WHEELS, VEHICLES AND METHODS OF MANUFACTURING SAME

(75) Inventors: Daisuke Nagao, Long Beach, CA (US); Kenji Tamura, Redondo Beach, CA (US)

(73) Assignee: Honda Motor Company, Ltd., Tokyo (JP)

( * ) Notice: Subject to any disclaimer, the term of this patent is extended or adjusted under 35 U.S.C. 154(b) by 149 days.

(21) Appl. No.: 12/254,861

(22) Filed: Oct. 21, 2008

(65) Prior Publication Data

US 2010/0096908 A1    Apr. 22, 2010

(51) Int. Cl.
*B60B 21/06* (2006.01)
*B60B 1/04* (2006.01)

(52) U.S. Cl. ............................ 301/59; 301/58; 301/104

(58) Field of Classification Search .................. 301/55, 301/56, 57, 58, 59, 61, 66, 67, 68, 69, 70, 301/71, 72, 73, 74, 75, 76, 79, 80, 81, 104; 152/76, 84, 85; D12/204, 205, 209
See application file for complete search history.

(56) References Cited

U.S. PATENT DOCUMENTS

| | | | | |
|---|---|---|---|---|
| 81,545 | A | * | 8/1868 | Shimer .......................... 301/67 |
| 81,758 | A | * | 9/1868 | De Valin ....................... 301/66 |
| 456,815 | A | * | 7/1891 | Hartman ....................... 301/55 |
| 633,282 | A | * | 9/1899 | Clay ............................. 301/73 |
| 766,439 | A | * | 8/1904 | Gilbert ......................... 474/196 |
| 1,025,555 | A | * | 5/1912 | Williams ....................... 152/84 |
| 1,316,377 | A | * | 9/1919 | Medynski .................... 152/402 |
| 1,706,297 | A | * | 3/1929 | Jessup ........................... 152/84 |
| 1,728,139 | A | * | 9/1929 | Scott ............................. 301/66 |
| 2,206,230 | A | * | 7/1940 | Maccabee .................... 152/253 |
| 2,378,154 | A | * | 6/1945 | Nelson ......................... 301/58 |
| 4,181,365 | A | | 1/1980 | Kawaguchi et al. |
| 4,693,520 | A | | 9/1987 | Brown |
| 5,707,114 | A | | 1/1998 | Schlanger |
| 6,068,347 | A | | 5/2000 | Okajima et al. |
| 6,231,127 | B1 | | 5/2001 | Watters |
| 6,588,853 | B2 | * | 7/2003 | Okajima ....................... 301/58 |
| 7,040,640 | B2 | * | 5/2006 | Conte .......................... 280/284 |
| D535,602 | S | * | 1/2007 | Ballentine ................... D12/209 |

* cited by examiner

*Primary Examiner*—S. Joseph Morano
*Assistant Examiner*—Kip T Kotter
(74) *Attorney, Agent, or Firm*—Ulmer & Berne LLP (57) ABSTRACT

A wheel includes a hub, a rim, and spokes. The hub includes inner attachment portions and is configured to support the wheel about a rotational axis. The spokes are attached to the hub and the rim and are together configured to radially support the rim with respect to the hub. In one embodiment, the spokes are attached to the hub with fasteners extending into threaded apertures in the hub, and the spokes are attached to the rim with fasteners extending in a direction parallel with the rotational axis. In another embodiment, respective ones of the spokes, which are attached to a common inner attachment portion of the hub, are not attached to adjacent outer attachment portions of the rim. Vehicles and methods of manufacturing a wheel are also provided.

22 Claims, 7 Drawing Sheets

WHEELS, VEHICLES AND METHODS OF MANUFACTURING SAME

TECHNICAL FIELD

Wheels are provided with removable spokes, and vehicles including one or more such wheels are also provided.

BACKGROUND

Wheels often significantly contribute to the styling of a vehicle such as a motorcycle. Conventional motorcycle wheels often include a hub, a rim, and spokes which attach the hub to the rim.

SUMMARY

In accordance with one embodiment, a wheel comprises a hub, a rim, a plurality of first fasteners, and a plurality of spokes. The hub comprises a plurality of inner attachment portions and is configured to support the wheel about a rotational axis. Each of the inner attachment portions comprises at least one threaded aperture extending radially inwardly and perpendicular to the rotational axis. Each of the plurality of first fasteners has a threaded end. Each of the plurality of spokes is attached to the hub and the rim and are together configured to radially support the rim with respect to the hub. Each of the spokes is attached to the hub by respective ones of the first fasteners extending into respective ones of the threaded apertures.

In accordance with another embodiment, a motorcycle comprises a frame. A front wheel and a rear wheel are each rotatably supported with respect to the frame. Each of the front wheel and the rear wheel comprises a hub, a rim, a plurality of first fasteners, and a plurality of spokes. The hub comprises a plurality of inner attachment portions. The hub is configured to support the wheel about a rotational axis. Each of the inner attachment portions comprises at least one threaded aperture extending radially inwardly and perpendicular to the rotational axis. Each of the plurality of first fasteners has a threaded end. Each of the plurality of spokes is attached to the hub and the rim and are together configured to radially support the rim with respect to the hub. Each of the spokes is attached to the hub by respective ones of the first fasteners extending into respective ones of the threaded apertures.

In accordance with yet another embodiment, a wheel comprises a hub, a rim, and a plurality of spokes. The hub comprises a plurality of inner attachment portions and is configured to support the wheel about a rotational axis. The rim comprises a plurality of outer attachment portions. Each of the plurality of spokes is attached to the hub and the rim and are together configured to radially support the rim with respect to the hub. Respective ones of the spokes which are attached to adjacent ones of the inner attachment portions of the hub are not attached to adjacent ones of the outer attachment portions of the rim.

In accordance with still another embodiment, a motorcycle comprises a frame. A front wheel and a rear wheel are each rotatably supported with respect to the frame. Each of the front wheel and the rear wheel comprise a hub, a rim, and a plurality of spokes. The hub comprises a plurality of inner attachment portions and is configured to support the wheel about a rotational axis. The rim comprises a plurality of outer attachment portions. Each of the plurality of spokes is attached to the hub and the rim and are together configured to radially support the rim with respect to the hub. Respective ones of the spokes attached to adjacent ones of the inner attachment portions of the hub are attached to non-adjacent ones of the outer attachment portions of the rim.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION

Figure 1:
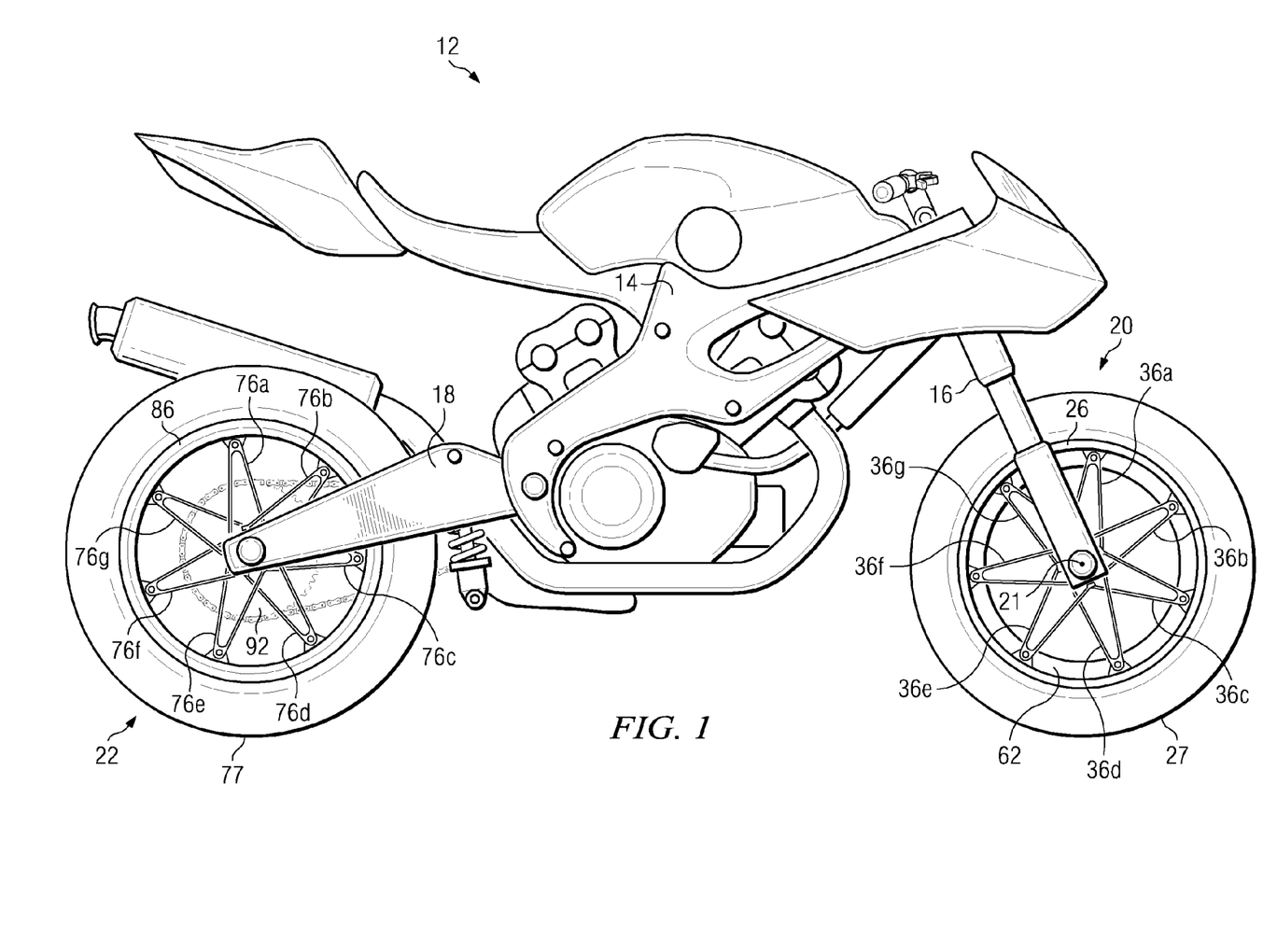
FIG. 1 is a right side elevational view depicting a motorcycle in accordance with one embodiment.

Embodiments are hereinafter described in detail in connection with the views and examples of FIGS. 1-8, wherein like numbers indicate the same or corresponding elements throughout the views. A wheel in accordance with one embodiment can be provided upon a vehicle such as, for example, a motorcycle, automobile, recreational vehicle, all terrain vehicle, truck, aircraft, bicycle, scooter, or toy. For example, as shown in FIG. 1, a motorcycle 12 can be provided with front and rear wheels 20 and 22 in accordance with one embodiment. The motorcycle 12 is shown to include a frame 14, a front fork assembly 16, and a rear swing arm 18. The front wheel 20 can be rotatably attached to the front fork assembly 16 and the rear wheel 22 can be rotatably attached to the rear swing arm 18. In this configuration, the front wheel 20 and the rear wheel 22 are each rotatably supported with respect to the frame 14 of the motorcycle 12. The front fork assembly 16 is shown to be pivotally attached to the frame 14 adjacent to a front end of the frame 14. The rear swing arm 18 is shown to be pivotally attached to the frame 14 adjacent to a rear end of the frame 14. However, it will be appreciated that front and rear wheels in accordance with various embodiments can be provided upon a motorcycle or other vehicle in any of a variety of alternative configurations.

Figure 2:
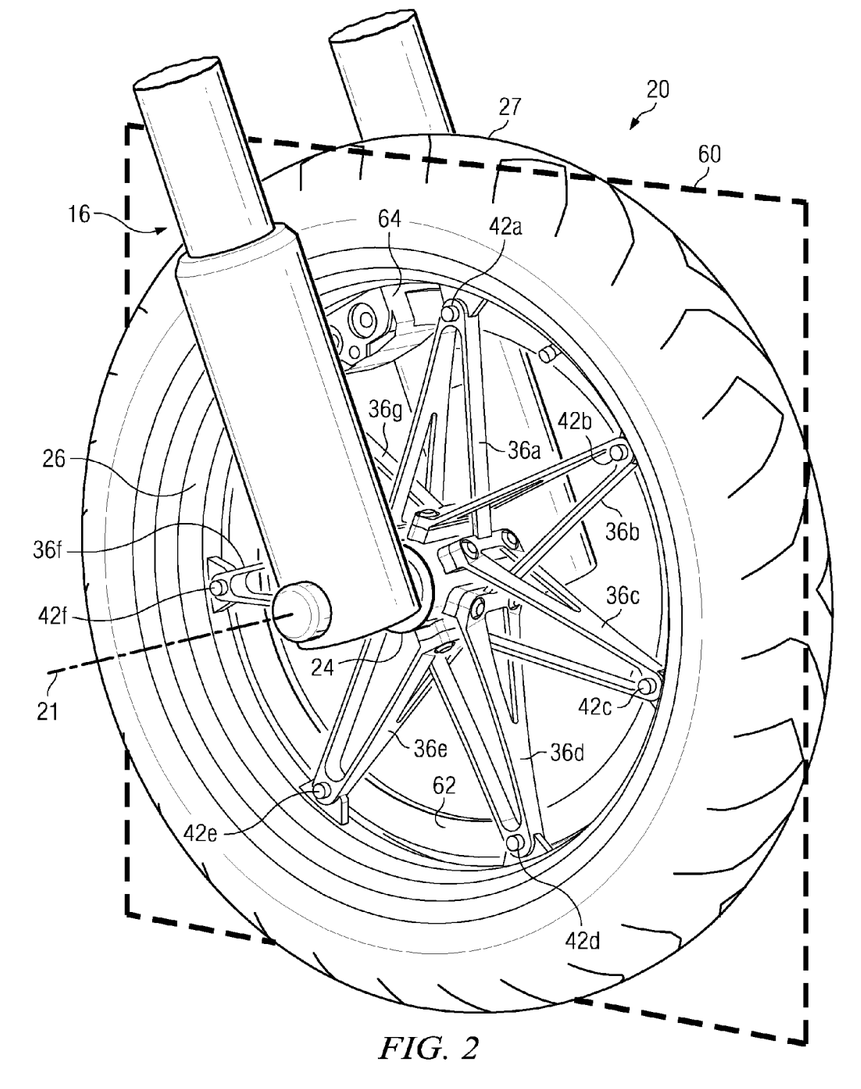
FIG. 2 is an enlarged right front perspective view depicting a portion of the motorcycle of FIG. 1.

In one embodiment, as shown in the embodiment of FIGS. 1-8, the front wheel 20 can comprise a hub 24, a rim 26, a tire 27, and a plurality of spokes 36a, 36b, 36c, 36d, 36e, 36f, and 36g. The tire 27 is shown in FIGS. 1-2 as being attached to the rim 26. The hub 24 can be rotatably attached to the front fork assembly 16 in any of a variety of alternative configurations, and can accordingly be configured to support the front wheel 20 about a rotational axis 21 with respect to the front fork assembly 16 as shown, for example, in FIGS. 1-2. The spokes 36a, 36b, 36c, 36d, 36e, 36f, and 36g are shown to each be attached to the hub 24 and the rim 26 such that they can together radially support the rim 26 with respect to the hub 24. While the front wheel 20 is shown to comprise seven spokes (i.e., 36a, 36b, 36c, 36d, 36e, 36f, and 36g), it will be appreciated that other wheels in accordance with alternative embodiments might include fewer or greater than seven spokes.

A wheel in accordance with one embodiment includes spokes which can be selectively disconnected and reconnected to a hub and/or rim so that the wheel may have a modular design. It will be appreciated that a wheel having a modular design can be easily and quickly reconfigured by mere replacement of the rim, the hub, and/or one or more of the spokes, and that such replacement can be accomplished relatively quickly and easily, and without need for sophisticated tools or training. For example, if the rim of such a wheel is damaged during use of the motorcycle, the wheel may be removed from the motorcycle, the rim may be disconnected from the spokes, and a new rim can be reattached to the spokes. As yet another example, if an operator wishes to change the configuration of the wheel to achieve an altered appearance or performance characteristic, the operator can effect removal and replacement of one or more spokes of the wheel. As still another example, if an operator wishes to install the wheel on a vehicle which requires a different style of hub, the operator can simply remove and replace the hub. A modular wheel can accordingly be selectively reconfigured by an operator to meet changing needs and/or desires of the operator, and without requiring replacement of the entire wheel.

Figure 3:
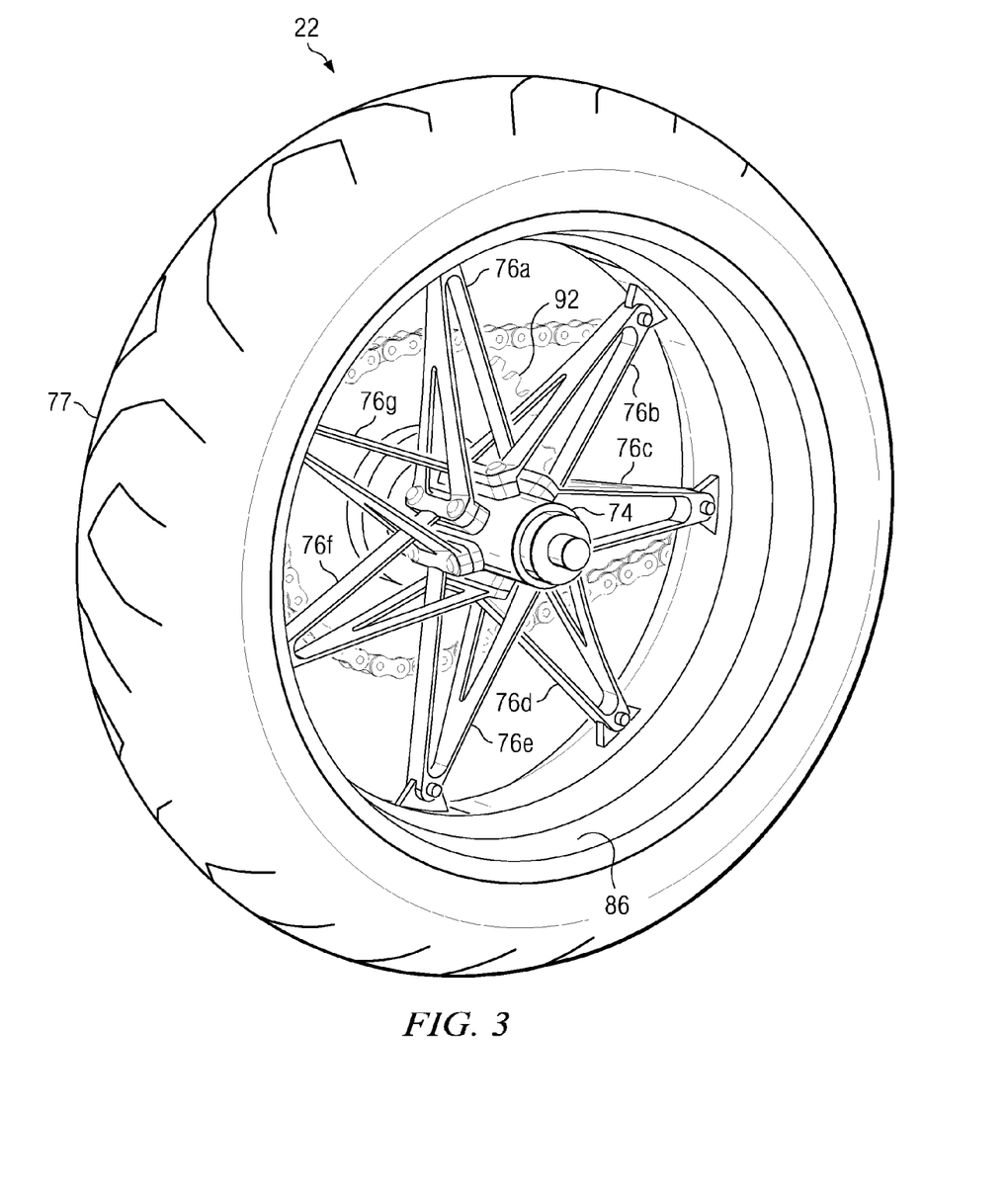
FIG. 3 is an enlarged right rear perspective view depicting the rear wheel, the drive sprocket, and a portion of the drive chain of the motorcycle of FIG. 1, wherein the rear swing arm and other components of the motorcycle are not depicted for clarity of illustration.
Figure 4:
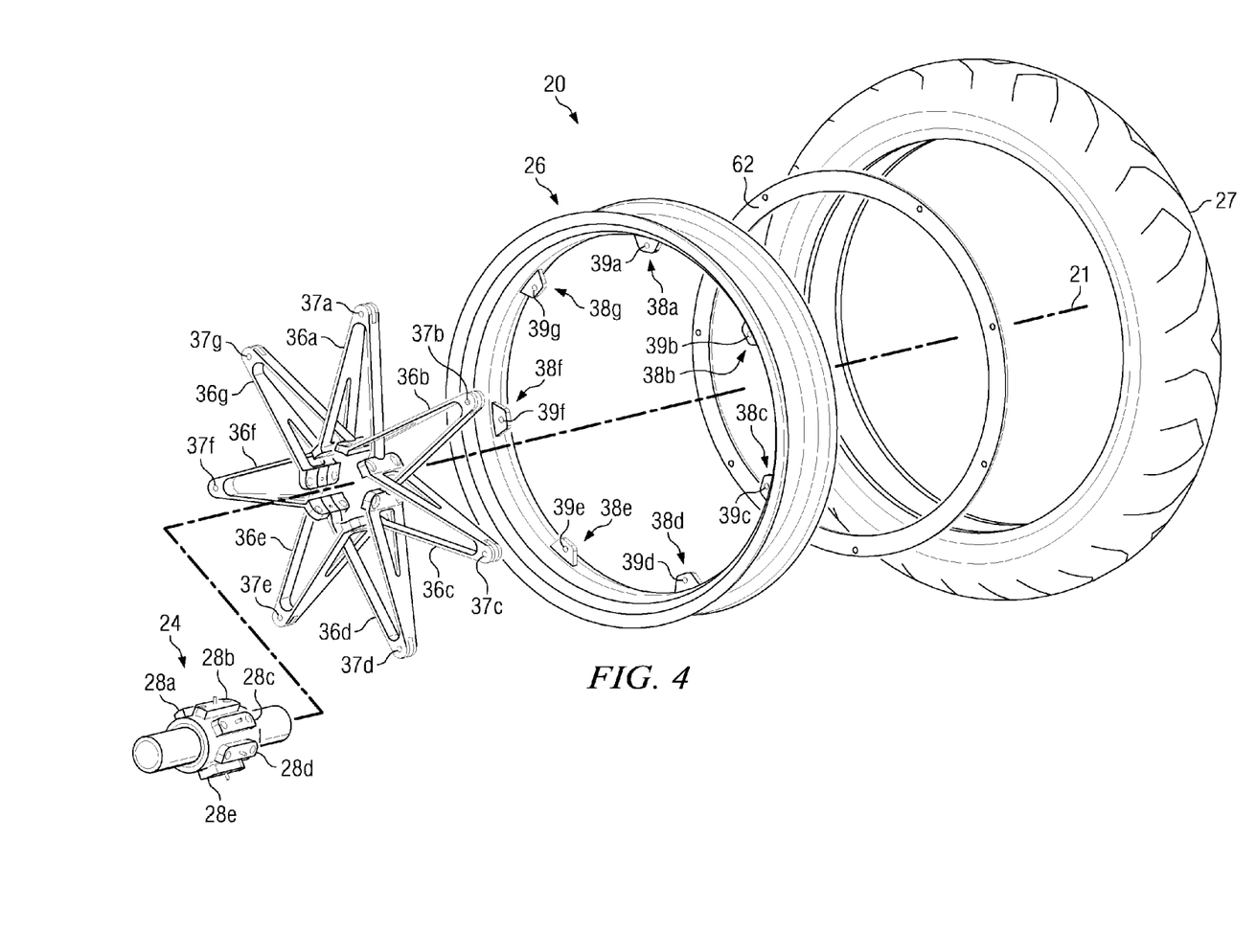
FIG. 4 is an exploded perspective view depicting selected components of the wheel of FIG. 2.
Figure 5:
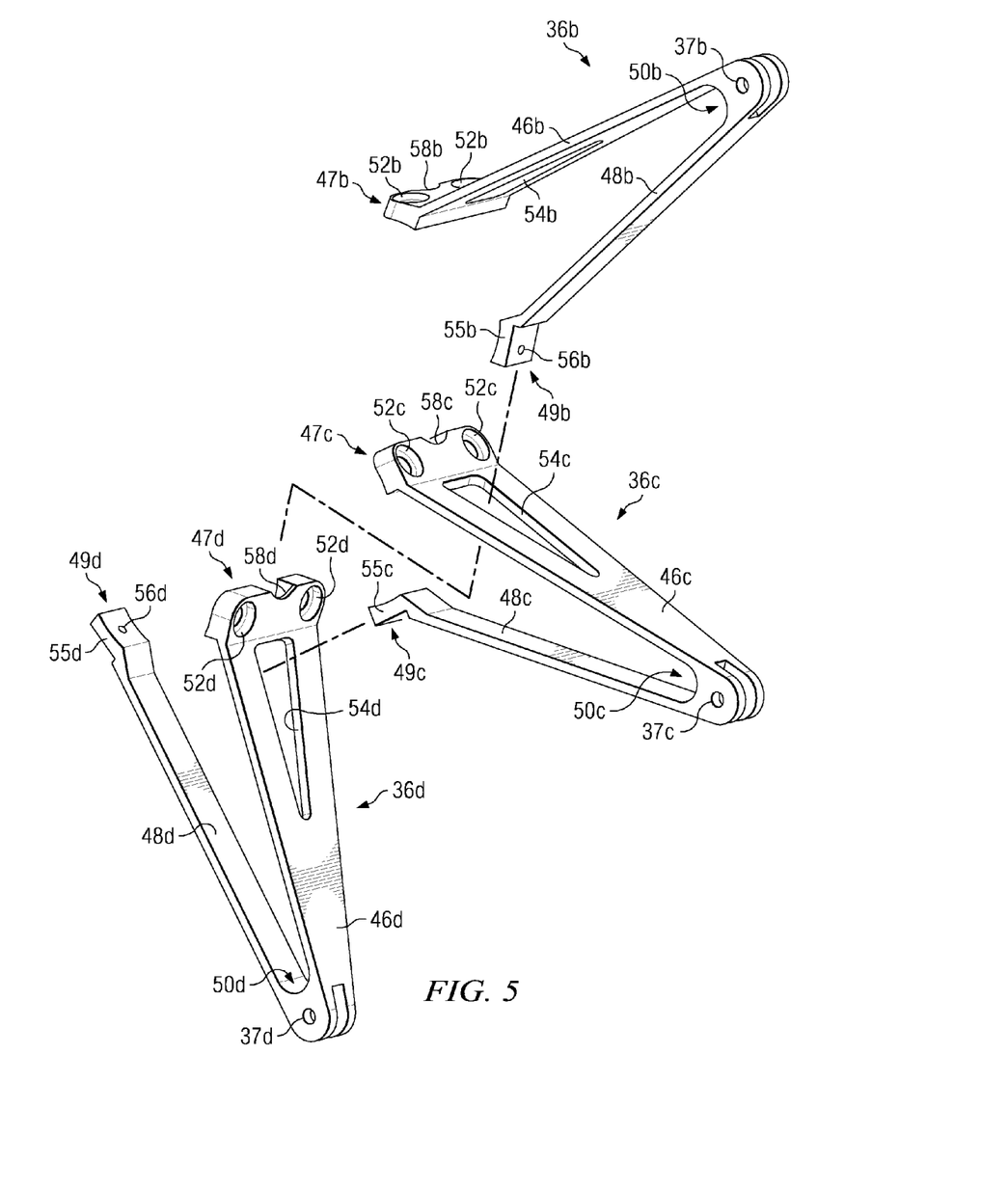
FIG. 5 is a perspective view depicting three respective spokes of the wheel of FIG. 2, wherein the spokes are depicted in a disassembled orientation.
Figures 6, 7:
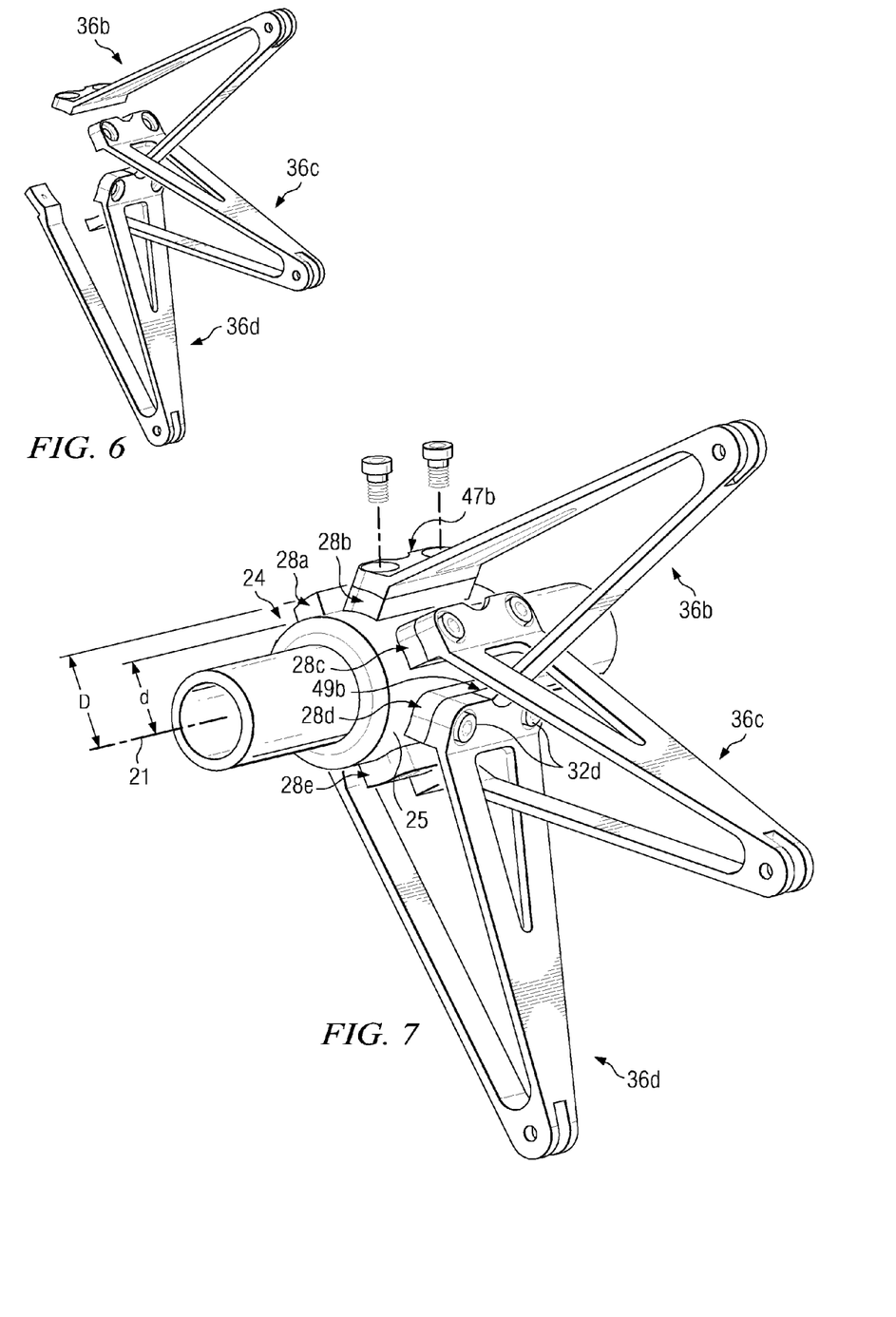
FIG. 6 is a perspective view depicting the three respective spokes of FIG. 5, wherein the spokes are depicted in a partially assembled orientation.
FIG. 7 is a perspective view depicting the three respective spokes of FIG. 6 in association with a hub and fasteners.
Figure 8:
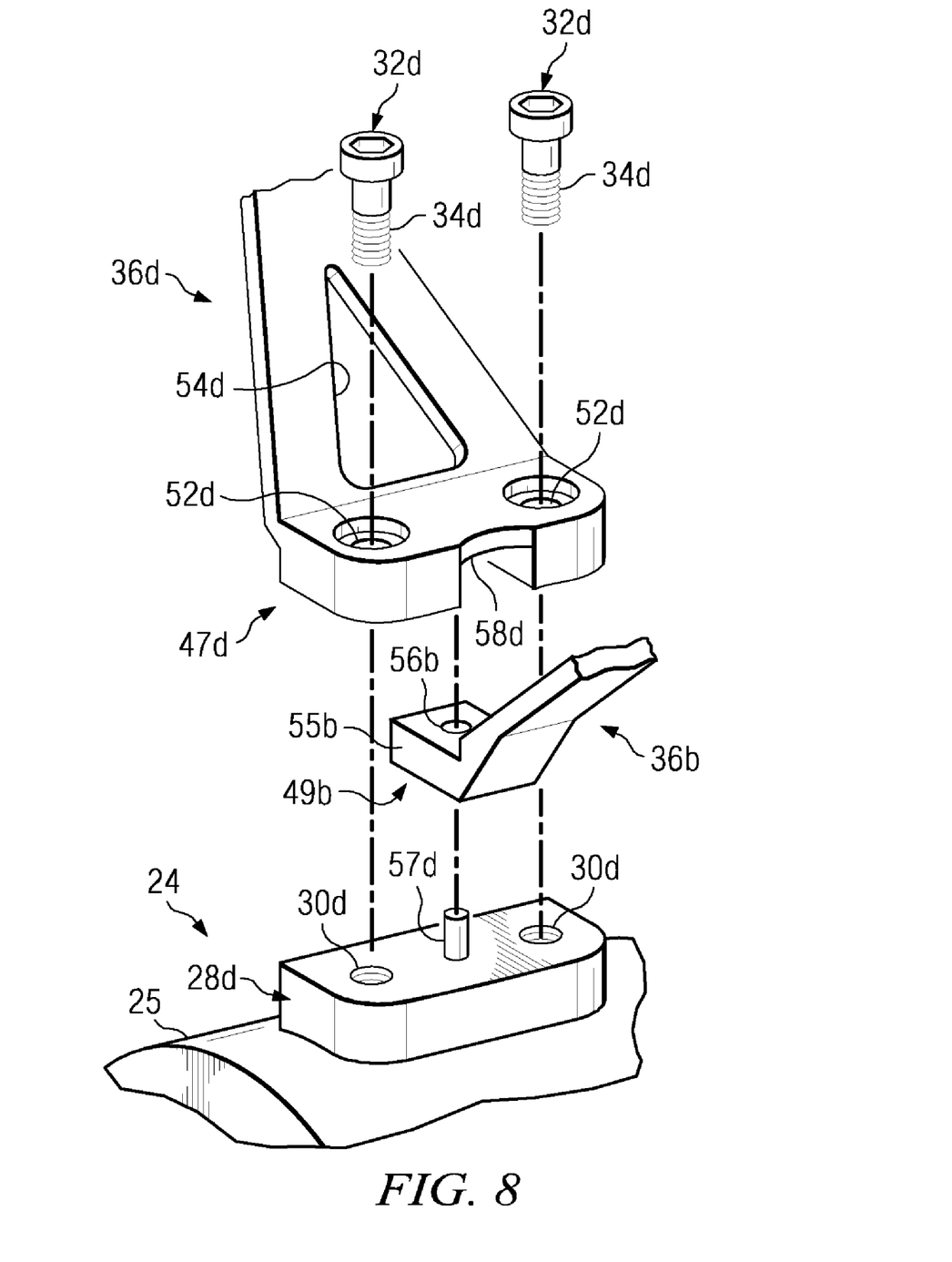
FIG. 8 is an exploded perspective view depicting selected components of the wheel of FIG. 2.

Still with reference to FIGS. 1-8, it can be seen that the hub 24 of the front wheel 20 can include a plurality of inner attachment portions (e.g., 28a, 28b, 28c, 28d, and 28e as shown in FIGS. 4 and 7-8). Each of the inner attachment portions can comprise at least one threaded aperture (e.g., 30d in inner attachment portion 28d as shown in FIG. 8) which extends radially inwardly and perpendicular to the rotational axis 21 of the front wheel 20. The hub 24 is also shown to comprise an exterior surface (25 shown in FIG. 7). In one embodiment, portions of the exterior surface 25 corresponding with the respective inner attachment portions (e.g., 28a, 28b, 28c, 28d, and 28e) can be spaced radially further outwardly from the rotational axis 21 than are portions of the exterior surface 25 disposed between adjacent inner attachment portions (e.g., 28a, 28b, 28c, 28d, and 28e).

For example, as shown in FIG. 7, the portion of the exterior surface 25 corresponding with the inner attachment portion 28a is shown to be spaced a distance "D" from the rotational axis 21 which is greater than the distance (e.g., "d" in FIG. 7) between the rotational axis 21 and portions of the exterior surface 25 disposed between adjacent inner attachment portions (e.g., 28a and 28b). Accordingly, the radial dimension of the hub 24 can be thicker at locations corresponding with inner attachment portions. It will be appreciated that this increased hub thickness can be useful for receiving the threads of fasteners which extend radially inwardly and perpendicular to the rotational axis 21 for attaching spokes (e.g., 36a, 36b, 36c, 36d, 36e, 36f, and 36g) to the hub 24. In other embodiments, it will be appreciated that the radial dimension of the hub might be substantially uniform such that portions of the hub's exterior surface corresponding with the inner attachment portions are spaced from the hub's rotational axis a distance substantially the same as that of portions of the exterior surface disposed between adjacent inner attachment portions (i.e., such that the exterior surface of the hub is substantially cylindrical).

Each of the spokes 36a, 36b, 36c, 36d, 36e, 36f, and 36g can be attached to inner attachment portions of the hub 24 as shown in FIGS. 1-8. For example, with reference to FIG. 8, it can be seen that fasteners 32d each having a threaded end 34d can extend through apertures 52d in a first end 47d of the spoke 36d and then into (e.g., by threading) threaded apertures 30d in the inner attachment portion 28d. In this configuration, the fasteners 32d can secure the first end 47d of the spoke 36d to the inner attachment portion 28d. The second end 49b of the spoke 36b can be secured with respect to the inner attachment portion 28d by being sandwiched between the first end 47d of the spoke 36d and the inner attachment portion 28d, as shown in FIGS. 7-8. In this manner, the fasteners 32d can attach the first end 47d of the spoke 36d and the second end 49b of the spoke 36b to the inner attachment portion 28d of the hub 24. It will be appreciated that spokes might similarly be attached to each of the other inner attachment portions of the hub 24 (e.g., as shown in FIGS. 1-2, 4 and 7).

With reference with FIGS. 1-8, and as best shown in FIGS. 2 and 4, the rim 26 of the front wheel 20 can include a plurality of outer attachment portions 38a, 38b, 38c, 38d, 38e, 38f, and 38g. In this particular embodiment, the outer attachment portions 38a, 38b, 38c, 38d, 38e, 38f, and 38g are shown to comprise tabs which each include a respective aperture 39a, 39b, 39c, 39d, 39e, 39f, and 39g. Each of the spokes 36a, 36b, 36c, 36d, 36e, 36f, and 36g can be attached to at least one of the outer attachment portions of the rim 26. For example, as shown in FIGS. 2 and 4, each of the spokes 36a, 36b, 36c, 36d, 36e, 36f, and 36g are shown to be respectively attached to each of the outer attachment portions 38a, 38b, 38c, 38d, 38e, 38f, and 38g of the rim 26. In particular, the spoke 36a is shown to sandwich the outer attachment portion 38a and a fastener 42a can be inserted through an aperture 37a in the spoke 36a and the aperture 39a in the outer attachment portion 38a. Each of the other spokes 36b, 36c, 36d, 36e, 36f, and 36g can similarly sandwich other respective outer attachment portions 38b, 38c, 38d, 38e, 38f, and 38g, and other respective fasteners (e.g., 42b, 42c, 42d, 42e, and 42f) can be inserted through respective apertures 37b, 37c, 37d, 37e, 37f, and 37g in the other respective spokes 36b, 36c, 36d, 36e, 36f, and 36g as well as the respective apertures 39b, 39c, 39d, 39e, 39f, and 39g in the other respective outer attachment portions 38b, 38c, 38d, 38e, 38f, and 38g. When these fasteners are inserted in this manner (as shown in FIG. 2), it will be appreciated that each of these fasteners can extend in a direction parallel with the rotational axis 21 of the front wheel 20.

In one embodiment, each of these fasteners (e.g., 42a, 42b, 42c, 42d, 42e, and 42f) can comprise a threaded end, and at least part of each aperture 37a, 37b, 37c, 37d, 37e, 37f, and 37g and/or at least part of each aperture 39a, 39b, 39c, 39d, 39c, 39f, and 39g can be threaded for selectively receiving and retaining the threaded ends of the respective fasteners. In other embodiments, non-threaded fasteners (e.g., rivets or roll-pins) might be used to facilitate attachment of spokes to outer attachment portions of a rim. In still other embodiments, spokes might be configured to selectively attach with corresponding outer attachment portions of a rim without use of fasteners. It will accordingly be appreciated that spokes may attach to outer attachment portions of a rim in any of a variety of configurations in accordance with various embodiments.

In one embodiment, each of the spokes 36a, 36b, 36c, 36d, 36e, 36f, and 36g can be at least substantially identical (i.e., substantially identical or identical) to one another. In another embodiment, respective spokes of a wheel might not be identical or substantially identical with other respective spokes of that wheel. As shown in the embodiment of FIG. 4, it can be seen that each of the spokes 36a, 36b, 36c, 36d, 36e, 36f, and 36g is identical to one another. Each of the spokes can include a first leg and a second leg which meet at an intersection. For example, referring to FIGS. 5-8, it can be seen that the spokes 36b, 36c, and 36d each respectively include a first leg 46b, 46c, and 46d and a second leg 48b, 48c, and 48d which meet at respective intersections 50b, 50c, and 50d.

In one embodiment, the first leg of each spoke can extend from a first end to the intersection, and the second leg of each spoke can extend from a second end to the intersection, such that the first leg and the second leg can extend from the intersection to define a V-shape. For example, referring to FIGS. 5-8, it can be seen that the first leg 46b, 46c, and 46d of each respective spoke 36b, 36c, and 36d is shown to extend from a first end 47b, 47c, and 47d to the respective intersection 50b, 50c, and 50d, and the second leg 48b, 48c, and 48d of each respective spoke 36b, 36c, and 36d is shown to extend from a second end 49b, 49c, and 49d to the respective intersection 50b, 50c, and 50d. The first leg 46b, 46c, and 46d and the second leg 48b, 48c, and 48d of each respective spoke 36b, 36c, and 36d extend from the respective intersection 50b, 50c, and 50d to define a V-shape, such that each respective spoke 36b, 36c, and 36d has a V-shape (as shown in FIG. 5).

Each of the spokes can include a respective tab. For example, as shown in FIG. 5, the second leg 48b, 48c, and 48d of each respective spoke 36b, 36c, and 36d is shown to include a respective tab 55b, 55c, and 55d which is adjacent to the second end 49b, 49c, and 49d of the second leg 48b, 48c, and 48d of each respective spoke 36b, 36c, and 36d. Each of the tabs can include at least one aperture (e.g., 56b and 56d) such as for receiving a pin (e.g., 57d in FIG. 8), a fastener, and/or some other structure. Each of the spokes can also include a respective receptacle configured for receiving a tab of another spoke. For example, as shown in FIG. 5, the first leg 46b, 46c, and 46d of each respective spoke 36b, 36c, and 36d is shown to include a respective receptacle 58b, 58c, and 58d which is adjacent to the first end 47b, 47c, and 47d of the first leg 46b, 46c, and 46d of each respective spoke 36b, 36c, and 36d.

For example, the tab 55b of the spoke 36b is shown in FIG. 8 to be selectively receivable within a receptacle 58d in the first end 47d of the spoke 36d. In one embodiment, when the tab 55b is sandwiched between the first end 47d of the spoke 36d and the inner attachment portion 28d (see FIGS. 7-8), a pin 57d provided upon the inner attachment portion 28d can be configured for insertion into an aperture 56b provided in the tab 55b. In one alternative embodiment, a pin might alternatively be provided by the first end 47d of the spoke 36d for selective insertion into a corresponding aperture in the tab 55b of the spoke 36b. In yet another alternative embodiment, such a pin might alternatively be provided upon the tab 55b for insertion into an aperture in the inner attachment portion 28d and/or in the first end 47d of the spoke 36d. It will be appreciated that any of a variety of other interlocking mechanical arrangements might be provided to secure ends of two respective spokes to a common inner attachment portion of a hub.

Each of the spokes can be configured for attachment to one of the outer attachment portions adjacent to its intersection. For example, referring to FIGS. 5-8, it can be seen that each of the spokes 36b, 36c, and 36d is shown to respectively include the apertures 37b, 37c, and 37d at a location adjacent to the respective intersection 50b, 50c, and 50d to facilitate attachment of the respective spoke 36b, 36c, and 36d to the respective outer attachment portion 39b, 39c, and 39d of the rim 26.

At least one of the first end and the second end of each of the spokes can be provided with at least one aperture through which at least one fastener extends into at least one threaded aperture in the hub. For example, referring to FIGS. 5-8, it can be seen that the first end 47b, 47c, and 47d of each of the spokes 36b, 36c, and 36d can be provided with at least one respective aperture 52b, 52c, and 52d through which at least one respective fastener (e.g., 32d in FIG. 8) extends into at least one threaded aperture (e.g., 30d in FIG. 8) in the hub 24. It will be appreciated that spokes can otherwise be provided with such apertures in any of a variety of alternative embodiments.

The front wheel 20 of FIGS. 1-8 is shown to be substantially symmetrical about an imaginary plane (60 in FIG. 2) which bisects the front wheel 20 in a direction perpendicular to the rotational axis 21 of the front wheel 20. The rear wheel 22 can also be substantially symmetrical about an imaginary plane which bisects the rear wheel 22 in a direction perpendicular to the rotational axis 23 of the rear wheel 22. A symmetrical wheel can be used upon any type of vehicle, and can be particularly advantageous for use upon a two-wheeled vehicle (e.g., a motorcycle, scooter, or bicycle) as it can have the same appearance regardless of what side the vehicle is viewed from. For example, the front and rear wheels 20 and 22 can have the same appearance regardless of what side the motorcycle 12 is viewed from. However, in other embodiments, it will be appreciated that a wheel might not be symmetrical regardless of whether the wheel is configured for use upon a two-wheeled vehicle or some other type of vehicle.

In one embodiment, two spokes may be attached to each inner attachment portion of the hub. However, these two spokes might not be attached to adjacent outer attachment portions of the rim. For example, with reference to FIGS. 4 and 7, the spokes 36b and 36d are shown to be attached to the inner attachment portion 28d of the hub 24. However, the spokes 36b and 36d are shown not to attach to adjacent outer attachment portions of the rim 26. Rather, the spoke 36b is shown to attach to the outer attachment portion 38b, and the spoke 36d is shown to attach to the outer attachment portion 38d. While the outer attachment portion 38b is shown in FIG. 4 to be adjacent to the outer attachment portion 38c, the outer attachment portion 38b is not shown to be adjacent to the outer attachment portion 38d.

Each of the first end and the second end of each of the spokes can be attached to respective non-adjacent inner attachment portions of the hub. For example, as shown in FIG. 7, the first end 47b of the spoke 36b is shown to be attached to the inner attachment portion 28b, while the second end 49b of the spoke 36b is shown to be attached to the inner attachment portion 28d. While the inner attachment portion 28b is shown in FIG. 7 to be adjacent to the inner attachment portion 28c, the inner attachment portion 28b is not shown to be adjacent to the inner attachment portion 28d.

In particular, with reference to FIGS. 5 and 7, the first leg 46d of the spoke 36d can be attached to the inner attachment portion 28d and can comprise a passage 54d through which the second leg 48c of the spoke 36c passes. The first leg 46c of the spoke 36c is shown to be attached to the inner attachment portion 28c which is adjacent to the inner attachment portion 28d. The second leg 48c of the spoke 36c is shown to be attached to the inner attachment portion 28e which is also adjacent to the inner attachment portion 28d. While the passage 54d is shown to comprise an aperture in the first leg 46d, it will be appreciated that the passage might alternatively be configured as a cutout, recess or other feature of the first leg 46d. Each of the other spokes 36a, 36b, 36c, 36e, 36f, and 36g are also shown to comprise similar passages (e.g., 54b and 54c shown in FIG. 5). It will therefore be appreciated that the spokes can be interlaced as shown in FIG. 4, for example.

In this configuration, respective ones of the spokes attached to adjacent ones of the inner attachment portions of the hub might not contact one another. For example, as shown in FIG. 7, the spoke 36b is attached to the inner attachment portions 28b and 28d, and the spoke 36c is attached to the inner attachment portions 28c and 28e. The inner attachment portion 28b is shown in FIG. 7 to be adjacent to the inner attachment portions 28a and 28c, and the inner attachment portion 28d is shown in FIG. 7 to be adjacent to the inner attachment portions 28c and 28e. Accordingly, in this embodiment, the spokes 36b and 36c are attached to adjacent ones of the inner attachment portions of the hub 24, although the spokes 36b and 36c are shown in FIG. 7 not to contact one another. In another embodiment, a wheel might be configured such that respective spokes attached to adjacent inner attachment portions do contact one another.

Likewise, respective ones of the spokes attached to adjacent ones of the outer attachment portions of the rim might not contact one another. For example, with reference to FIGS. 2, 4, and 7, the spoke 36b is attached to the outer attachment portion 38b, and the spoke 36c is attached to the outer attachment portion 38c. The outer attachment portion 38b is shown in FIG. 4 to be adjacent to the outer attachment portion 38c, for example. Accordingly, in this embodiment, the spokes 36b and 36c are attached to adjacent ones of the outer attachment portions of the rim 26, although the spokes 36b and 36c are shown in FIG. 7 not to contact one another. In another embodiment, a wheel might be configured such that respective spokes attached to adjacent outer attachment portions do contact one another.

A brake disc 62 is shown in FIGS. 1-2 as being attached to the rim 26 of the front wheel 20 (e.g., such as with bolts or other fasteners), and a brake caliper 64 is depicted as being attached to the front fork assembly 16 for selectively grasping the brake disc 62 for slowing or stopping the motorcycle 12. It will be appreciated that, in an alternative embodiment, a brake disc might be attached to a different part of the front wheel 20, such as to the hub 24.

Like the front wheel 20, the rear wheel 22 of the motorcycle 12 is shown in FIGS. 1 and 3 to include a hub 74, a rim 86, a tire 77, and a plurality of spokes 76a, 76b, 76c, 76d, 76e, 76f, and 76g, and to be configured much as described above with respect to the front wheel 20. The hub 74 can be rotatably attached to the rear swing arm 18 in any of a variety of configurations, and can accordingly be configured to support the rear wheel 22 about a rotational axis 23 with respect to the rear swing arm 18 as shown, for example, in FIG. 1. A drive sprocket 92 is shown in FIGS. 1 and 3 as being attached to the hub 74 of the rear wheel 22 for operatively coupling the rear wheel 22 to an engine of the motorcycle 12. It will be appreciated that the drive sprocket 92 can be configured to interface a drive belt or drive chain, for example, as shown in FIGS. 1 and 3. It will also be appreciated that the drive sprocket 92 might additionally be configured to serve as a brake disc for selectively interacting with a brake caliper attached to the rear swing arm 18 of the motorcycle 12. In another embodiment, a brake disc might be provided and attached to the rear wheel 22 separately from the drive sprocket 92. It will also be appreciated that a drive sprocket and/or brake disc can be attached to a rear wheel in any of a variety of alternative configurations.

The front wheel 20 can be assembled or manufactured by following any of a variety of sequences of suitable process steps. For example, in one embodiment, the spokes 36a, 36b, 36c, 36d, 36e, 36f, and 36g can first be arranged and interlocked in a cartwheel configuration as shown in FIG. 4. In particular, one leg (e.g., 48b in FIG. 5) of each wheel spoke (e.g., 36b in FIG. 5) can be passed through a passage (e.g., 54c in FIG. 5) in a leg (e.g., 46c in FIG. 5) of another wheel spoke (e.g., 36c in FIG. 5). A tab (e.g., 55b in FIG. 5) of each wheel spoke (e.g., 36b in FIG. 5) can then be inserted into a receptacle (e.g., 58d) of yet another wheel spoke (e.g., 36d in FIG. 5). Each of the spokes 36a, 36b, 36c, 36d, 36e, 36f, and 36g can then be attached to the hub 24 through insertion of threaded fasteners (e.g., 32d in FIG. 8) through apertures in the spokes (e.g., 52d in FIG. 8) and into threaded apertures (e.g., 30d in FIG. 8) in the hub 24.

The rim 26 can then be attached to the spokes 36a, 36b, 36c, 36d, 36e, 36f, and 36g by insertion of fasteners (e.g., 42b in FIG. 2) through corresponding apertures (e.g., 37b and 39b in FIG. 4) in the spokes (e.g., 36b in FIG. 2) and the outer attachment portions (e.g., 38b in FIG. 4). The brake disc 62 might then be attached to the rim 26 and/or to another portion of the front wheel 20. The tire 27 can then be attached to the rim 26, and the hub 24 can be attached to the front fork assembly 16 of the motorcycle 12. It will be appreciated that a similar process might be used to assemble or manufacture the rear wheel 22. It will also be appreciated that the front wheel 20 and/or the rear wheel 22 and/or wheels in accordance with other embodiments can be manufactured in accordance with any of a variety of alternative process steps or arrangements thereof.

The foregoing description of embodiments and examples of the invention has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate the principles of the invention and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A wheel comprising:

a hub comprising a plurality of inner attachment portions, wherein the hub is configured to support the wheel about a rotational axis, and wherein each of the inner attachment portions comprises at least one threaded aperture extending radially inwardly and perpendicular to the rotational axis;

a rim comprising a plurality of outer attachment portions;

a plurality of first fasteners each having a threaded end; and a plurality of spokes together configured to radially support the rim with respect to the hub, each of said spokes is at least substantially identical and comprises a first leg and a second leg, the first leg and the second leg meet at an intersection, the first leg extends from a first end to the intersection, the second leg extends from a second end to the intersection, and the first leg and the second leg extend from the intersection to define a V-shape; wherein each of said spokes is attached to the hub by respective ones of said first fasteners extending into respective ones of said threaded apertures, with at least one of the first end and the second end of each of said spokes being provided with at least one aperture through which at least one of said first fasteners extends into at least one of said threaded apertures in the hub;

each of said spokes is attached to one of said outer attachment portions of the rim adjacent to the intersection; and a first leg of one of said spokes is attached to a first one of said inner attachment portions and comprises a passage through which a second leg of another one of said spokes passes, and wherein the another one of said spokes is attached to a second one of said inner attachment portions which is adjacent to the first one of said inner attachment portions.

2. The wheel of claim 1 wherein the hub comprises an exterior surface and portions of the exterior surface corresponding with the respective inner attachment portions are spaced radially further outwardly from the rotational axis than are portions of the exterior surface disposed between adjacent inner attachment portions.

3. The wheel of claim 1 wherein the wheel is substantially symmetrical about an imaginary plane bisecting the wheel in a direction perpendicular to the rotational axis.

4. The wheel of claim 1 further comprising
a plurality of second fasteners
wherein each of said spokes is attached to at least one of said outer attachment portions by at least one of said second fasteners extending in a direction parallel with the rotational axis and through respective apertures in said spoke and said outer attachment portion.

5. The wheel of claim 1 wherein two of said spokes are attached to each inner attachment portion of the hub.

6. The wheel of claim 5 wherein said two of said spokes are not attached to adjacent outer attachment portions.

7. The wheel of claim 6 wherein respective ones of said spokes attached to adjacent outer attachment portions do not contact one another.

8. The wheel of claim 5 wherein each of the first end and the second end of each of said spokes is attached to respective non-adjacent inner attachment portions of the hub.

9. A motorcycle comprising at least two of said wheel of claim 1, and further comprising a frame, each of said wheels being rotatably supported with respect to the frame.

10. A wheel comprising:
a hub comprising a plurality of inner attachment portions, wherein the hub is configured to support the wheel about a rotational axis;
a rim comprising a plurality of outer attachment portions; and
a plurality of spokes, each attached to the hub and the rim and together configured to radially support the rim with respect to the hub, each of said spokes is at least substantially identical and comprises a first leg and a second leg, the first leg and the second leg meet at an intersection, the first leg extends from a first end to the intersection, the second leg extends from a second end to the intersection, and the first leg and the second leg extend from the intersection to define a V-shape; wherein each of the first end and the second end of each of said spokes is attached to respective non-adjacent inner attachment portions of the hub;

each of said spokes is configured for attachment to one of said outer attachment portions adjacent to the intersection;

respective ones of said spokes attached to adjacent ones of the inner attachment portions of the hub are not attached to adjacent ones of the outer attachment portions of the rim; and a first leg of one of said spokes is attached to a first one of said inner attachment portions and comprises a passage through which a second leg of another one of said spokes passes, and wherein the another one of said spokes is attached to a second one of said inner attachment portions which is adjacent to the first one of said inner attachment portions.

11. The wheel of claim 10
wherein respective ones of the spokes attached to a common one of the inner attachment portions of the hub are not attached to adjacent ones of the outer attachment portions of the rim.

12. The wheel of claim 10 wherein the wheel is substantially symmetrical about an imaginary plane bisecting the wheel in a direction perpendicular to the rotational axis.

13. The wheel of claim 10 further comprising a plurality of first fasteners and a plurality of second fasteners, wherein:
each of the inner attachment portions of the hub comprises at least one threaded aperture extending radially inwardly and perpendicular to the rotational axis;
at least one of the first end and the second end of each of said spokes is provided with at least one aperture through which at least one of said first fasteners extends into at least one of said threaded apertures in the hub; and
each of said spokes is attached to at least one of said outer attachment portions by at least one of said second fasteners extending in a direction parallel with the rotational axis and through respective apertures in said spoke and said outer attachment portion.

14. The wheel of claim 10 wherein respective ones of the spokes attached to adjacent ones of the inner attachment portions of the hub do not contact one another.

15. A motorcycle comprising at least two of said wheel of claim 10, and further comprising a frame, each of said wheels being rotatably supported with respect to the frame.

16. The wheel of claim 10 wherein two of said spokes are attached to each inner attachment portion of the hub.

17. The wheel of claim 16 wherein said two of said spokes are not attached to adjacent outer attachment portions.

18. The wheel of claim 17 wherein respective ones of said spokes attached to adjacent outer attachment portions do not contact one another.

19. The wheel of claim 10 wherein the hub comprises an exterior surface and portions of the exterior surface corresponding with the respective inner attachment portions are spaced radially further outwardly from the rotational axis than are portions of the exterior surface disposed between adjacent inner attachment portions.

20. A method of manufacturing a wheel, the method comprising:
interlocking a plurality of identical V-shaped wheel spokes by passing a first leg of each of said wheel spokes through a passage in a second leg of another one of said wheel spokes;
attaching each of said wheel spokes to a hub; and
attaching each of said wheel spokes to a rim.

21. The method of claim 20 wherein the attaching of said wheel spokes to the hub comprises inserting fasteners into at least one threaded aperture in the hub, wherein the threaded aperture extends radially inwardly and perpendicular to a rotational axis of the wheel.

22. The method of claim 21 wherein the attaching of each of said wheel spokes to the rim comprises inserting fasteners in a direction parallel with a rotational axis of the wheel.

* * * * *

UNITED STATES PATENT AND TRADEMARK OFFICE
CERTIFICATE OF CORRECTION

PATENT NO.         : 7,891,745 B2
APPLICATION NO.    : 12/254861
DATED              : February 22, 2011
INVENTOR(S)        : Daisuke Nagao et al.

It is certified that error appears in the above-identified patent and that said Letters Patent is hereby corrected as shown below:

Column 3, line 59, change "36d, 36c, 36f," to -- 36d, 36e, 36f, --;

Column 4, line 49, change "421" to -- 42f --; and

Column 4, line 52, change "39c, 39f," to -- 39e, 39f, --.

Signed and Sealed this
Twenty-sixth Day of April, 2011

David J. Kappos
*Director of the United States Patent and Trademark Office*